June 2, 1936.  E. P. BULLARD  2,042,502

MECHANICAL CHUCK OPERATOR

Filed Jan. 16, 1936

INVENTOR.
E. P. BULLARD
BY
A. T. Sperry
ATTORNEY

Patented June 2, 1936

2,042,502

UNITED STATES PATENT OFFICE 2,042,502

MECHANICAL CHUCK OPERATOR

Edward P. Bullard, Fairfield, Conn., assignor to The Bullard Company, a corporation of Connecticut Application January 16, 1936, Serial No. 59,447

13 Claims. (Cl. 29—38)

This invention relates to mechanical chuck operators more particularly designed for the operation of chuck jaws for machine tools having a plurality of sets of such jaws mounted upon a rotary table, the invention being equally applicable to machines in which a work carrying table is continuously moved and to machine tools of the station type in which a table is periodically moved to present the work to individual working stations.

It is among the objects of the invention to supply a simple, effective and efficient instrumentality for automatically actuating chuck jaws as a consequence of the movement of a carrier.

Another object is to provide a single, simple instrumentality for actuating all of the chucks of a series of such chucks of a multiple work holding machine.

Another object is to provide an instrumentality of the type set forth which will be simple, efficient, easily applied and easily removed from the machine and which may be readily adjusted.

A further object is to provide a device of the character set forth, which is responsive to the pressure applied by the chuck jaws, and which, after the application of predetermined pressure, acts to discontinue chuck movement so as to preclude the danger of injury to operating parts.

Another object is to provide an assembly which will operate, as a result of carrier movement, to both open and close the chuck jaws in timed sequence and without the necessity of manual operation.

Figure 1:
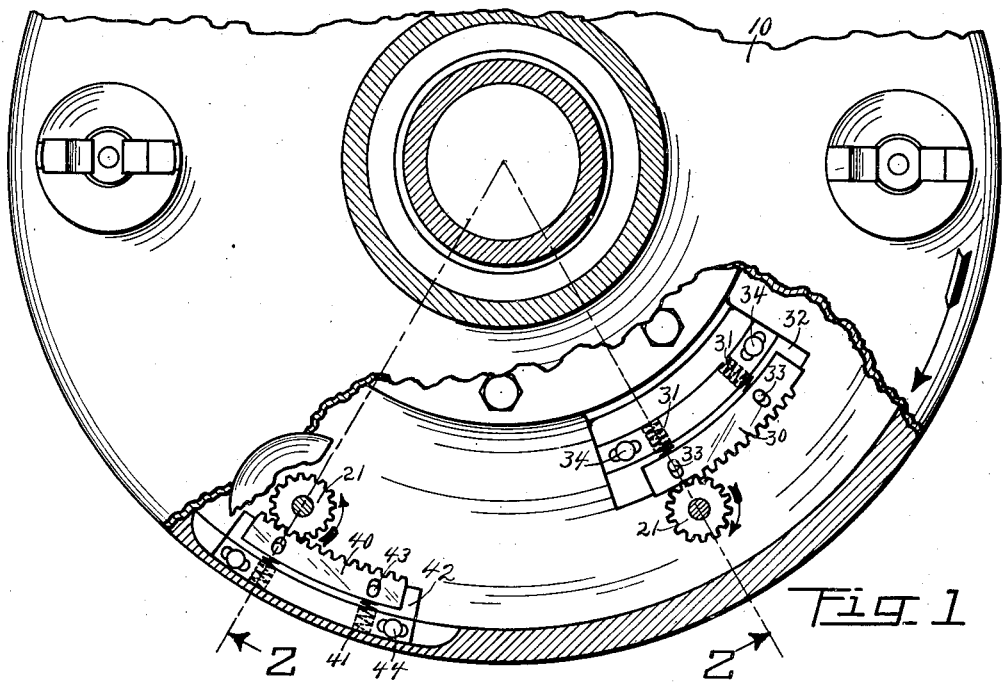
Figure 2:
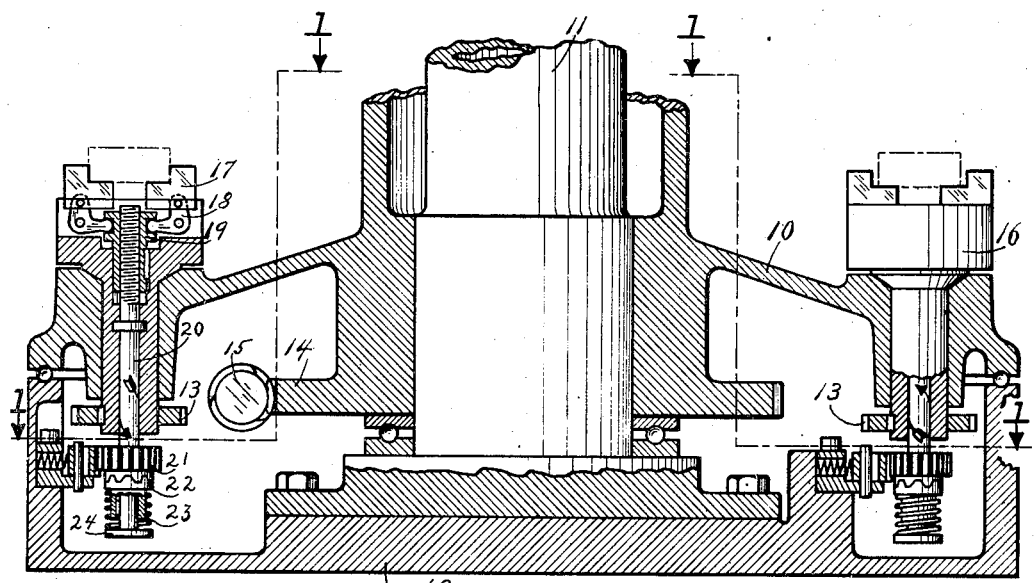

Other objects and features of the invention will be apparent from a consideration of the following specification taken in conjunction with the accompanying drawing in which:

Figure 1 is a plan view of a machine tool table, partly broken away, and illustrating one embodiment of the invention; and Figure 2 is a vertical section taken on the lines 2—2 of Figure 1.

In the illustrated concept of the invention, the chuck operating means, for both opening and closing chuck jaws, have been illustrated and the invention has been shown as applied to a multiple chuck machine tool having a rotary carrier in which the fixtures and their chucks are mounted. It will be obvious that the invention is not limited to this specific type of machine, nor is the invention limited to the combination of both opening and closing means. Obviously, numerous changes, modification and the full use of equivalents may be resorted to without departing from the spirit or scope of the invention.

In that form of the invention shown, a rotary carrier, having rotary work spindles and fixtures, is shown, each spindle being provided with chuck jaws operable by a rotary shaft extending through the spindle. This operating shaft is provided with a gear which, in the course of movement of the carrier, contacts and enmeshes with gear teeth fixed with respect to the rotation of the carrier and arranged in the path of movement of the chuck operating gear so that, upon contact, the chuck operating gear will be rotated to open or close the chuck jaws; one of such fixed members being provided to open the jaws as the spindle enters the loading station and a similar member being provided to close the jaws as the spindle leaves the loading station.

Referring more specifically to the drawing, the numeral 10 indicates a carrier of a multiple spindle machine tool, the carrier being mounted to rotate about a fixed column 11 supported from a base 12 of the machine. The carrier is shown as being adapted for drive by a gear 14, formed externally therewith, which is adapted to be driven from a worm 15, either intermittently or continuously, it being understood that the invention is equally applicable to continuously driven tables or periodically driven ones.

Mounted within the carrier 10 are the work holding spindles 16, which are shown as being adapted for drive by spindle gears 13, it being understood, of course, that the invention is not limited to this type of machine since it is equally applicable to machines in which the work is merely held stationary on the table and acted upon by rotary tools.

Each spindle, 16, is provided with work holding chuck jaws 17 adapted to be moved inwardly and outwardly by bell cranks 18, actuated by threaded collars 19, which are moved up and down through threaded engagement with a rotary chuck actuating shaft 20.

Each shaft, 20, is provided with a driving gear 21, loosely mounted thereon, and adapted for coupling with the shaft 20 by a clutch 22, slidable on the shaft 20 and keyed thereto, and held in engagement with the gear by a spring 23, the tension of which may be adjusted by a nut 24. This arrangement is such that, in either inward or outward movement of the chuck jaws, the spring pressure will measure the pressure applied by the jaws, and when the jaws have reached the full desired extension of their movement, further rotation of the gear 21 will cam outwardly the clutch 22, thus to disengage the drive to the shaft 20 and thus to preclude breakage of parts.

The gears 21, in their orbital movement with the carrier, are adapted to engage racks fixed with respect to the rotation of the carrier, but adjustably and resiliently mounted so that, upon first contact of the gears with the teeth of the rack, there will be no danger of gear clashing.

In the drawing of the preferred form of the invention as shown, two such racks are provided: a first rack 30 being mounted on the inner side of the orbital path of the gears 21 and being adapted to engage the gears as the spindles approach the loading station, as may be defined by the angle of lines 2—2 in Figure 1. The rack 30 is urged in outward position by springs 31 carried by a guiding bracket 32, the rack being mounted upon pins 33 so as to guide its movement, but being arranged to move inwardly upon contact with the gears 21 so as to facilitate the enmeshment of the gear teeth with the rack teeth. The bracket 32 is preferably adjustably mounted, as by screws 34, so that the area of the loading station and the time at which the unchucking is accomplished may be readily varied.

A similar structure for closing the jaws includes a second rack 40 positioned on the outer side of the orbital path. The rack 40 is outwardly urged by springs 41 and a bracket 42 mounted upon pins 43, the rack 40 being on the external side of the path of the gears 21 and adapted to close the jaws of the chuck as it leaves the loading station. The bracket 42 is also adapted to be adjustably positioned by means of screws 44.

It will, of course, be understood that whether the racks be on the inside or outside of the path of the gears is a matter within the choice of the designer and is determined by the direction of the threads on the operating shaft and the direction of the movement of the carrier.

In the operation of the device, it will be understood that, with the carrier moving in the direction of the arrow in Figure 1, the gear 21 of each spindle will come in contact with the rack 30 and, as the spindle is moved past the rack by the movement of the carrier, the engagement of the teeth of the gear with those of the rack will cause the gear to be rotated in a direction to rotate the shaft 20 for moving upwardly the collar 19 and opening the chuck jaws; any difficulty of enmeshment being compensated for by the spring mounting of the rack and, when the jaws have reached the extension of their opening, if the gear is still in contact with the rack, the gear will cam outwardly the clutch 22 and permit the shaft 20 to remain stationary in spite of further rotation of the gear.

A reverse action is similar: as the gear leaves the loading station, since the gear 21 will strike the rack 40, which will rotate the gear in opposite direction to close the chuck jaws, and when sufficient pressure is applied on the closing, the gear will again cam outwardly the clutch until such time as the gear is past the rack 40.

From the foregoing, it will be seen that the invention provides a simple, efficient and wholly automatic structure, not requiring any attention from the operator, and which will automatically function with ease and simplicity to operate the chuck jaws of a multiple work table.

Having set forth the nature of my invention, what I claim is:

1. In a machine tool, a bodily moving work holding fixture, chuck jaws mounted thereon, a gear carried by said fixture for moving said chuck jaws and a stationary rack, with respect to which said fixture moves, adapted to engage said gear to effect movement of said chuck jaws in response to bodily movement of said fixture.

2. In a machine tool, a bodily moving work holding fixture, chuck jaws mounted thereon, a gear carried by said fixture for moving said chuck jaws and a pair of stationary racks, with respect to which said fixture moves, adapted to engage said gear to effect opening and closing, respectively, of said chuck jaws in response to bodily movement of said fixture.

3. In a machine tool, a bodily moving work holding fixture, chuck jaws mounted thereon, a gear carried by said fixture for moving said chuck jaws and a pair of resiliently mounted stationary racks, with respect to which said fixture moves, adapted to engage said gear to effect opening and closing, respectively, of said chuck jaws in response to bodily movement of said fixture.

4. In a machine tool, a bodily moving work holding fixture, chuck jaws mounted thereon, a gear carried by said fixture for moving said chuck jaws and a pair of adjustably mounted stationary racks, with respect to which said fixture moves, adapted to engage said gear to effect opening and closing, respectively, of said chuck jaws in response to bodily movement of said fixtures.

5. In a machine tool, a bodily moving work holding fixture, chuck jaws mounted thereon, a gear carried by said fixture for moving said chuck jaws and a pair of stationary racks, resiliently and adjustably mounted, with respect to which said fixture moves, adapted to engage said gear to effect opening and closing, respectively, of said chuck jaws in response to bodily movement of said fixture.

6. In a machine tool, a bodily moving work holding fixture, chuck jaws mounted thereon, a gear carried by said fixture for moving said chuck jaws, a pair of stationary racks, resiliently and adjustably mounted, with respect to which said fixture moves, adapted to engage said gear to effect opening and closing, respectively, of said chuck jaws in response to bodily movement of said fixture and a torque responsive coupling between said chuck jaws and said gear.

7. In a machine tool, a bodily moving work holding fixture, chuck jaws mounted thereon, a gear carried by said fixture for moving said chuck jaws, a pair of stationary racks, resiliently and adjustably mounted, with respect to which said fixture moves, adapted to engage said gear to effect opening and closing, respectively, of said chuck jaws in response to bodily movement of said fixture and an adjustable torque responsive coupling between said chuck jaws and said gear.

8. In a machine tool, a rotary carrier, a plurality of work holding spindles mounted thereon, chucks on said spindles, a rotary shaft extending through said spindles for operating said chucks, means associated with said shaft for rotating the same, including a torque responsive lost motion connection, and a stationary element for engaging said means in response to predetermined movement of said carrier to actuate said shaft within the limits imposed by the torque responsive element.

9. In a machine tool, a rotary carrier, work holding spindles mounted therein, chucks mounted on said spindles, a rotary chuck operating rod extending through said spindles, a gear loosely mounted thereon, a torque responsive clutch connecting said gear to rotate said shaft and a fixed element mounted thereon to engage said gear in response to predetermined movement of the carrier to operate said shaft within the limits of the torque responsive connection.

10. In a machine tool, a rotary carrier, work holding spindles mounted therein, chucks mounted on said spindles, a rotary chuck operating rod extending through said spindles, a gear loosely mounted thereon, a torque responsive clutch connecting said gear to rotate said shaft and a fixed element mounted thereon to engage said gear in response to predetermined movement of the carrier to operate said shaft within the limits of the torque responsive connection, said element including a rack engageable by the teeth of said gear.

11. In a machine tool, a rotary carrier, work holding spindles mounted therein, chucks mounted on said spindles, a rotary chuck operating rod extending through said spindles, a gear loosely mounted thereon, a torque responsive clutch connecting said gear to rotate said shaft and a fixed element mounted thereon to engage said gear in response to predetermined movement of the carrier to operate said shaft within the limits of the torque responsive connection, said element including a rack engageable by the teeth of said gear and said rack being adjustably positioned with respect to the orbital path of said spindles.

12. In a machine tool, a rotary carrier, work holding spindles mounted therein, chucks mounted on said spindles, a rotary chuck operating rod extending through said spindles, a gear loosely mounted thereon, a torque responsive clutch connecting said gear to rotate said shaft and a fixed element mounted thereon to engage said gear in response to predetermined movement of the carrier to operate said shaft within the limits of the torque responsive connection, said element including a rack engageable by the teeth of said gear and said rack being adjustably positioned with respect to the orbital path of said spindles and being resiliently mounted.

13. In a machine tool, a rotary carrier, work holding spindles mounted thereon for movement in an orbital path thereby, gears for rotating said spindles, chuck jaws mounted on said spindles, a threaded rotary chuck operating shaft extending through said spindles, a connection between said shaft and said chuck jaws for opening and closing the same in response to the rotation of said shaft, a gear loosely mounted on said shaft, a spring-urged clutch engageable with said gear and keyed to said shaft, a pair of spaced, adjustable, resiliently mounted, relatively stationary racks engageable with said gear upon orbital movement of said carrier to rotate the same respectively in opposite directions and means for varying the spring pressure applied to said clutch, thus to adjust the pressure applied to said chuck jaws through the engagement of said gear with said racks.

EDWARD P. BULLARD.